United States Patent Office 3,795,706
Patented Mar. 5, 1974

3,795,706
FLUOROPERHALODIAZAOLEFINS AND THEIR METHOD OF PREPARATION
Bryce C. Oxenrider, Florham Park, N.J., Wilhelmus M. Beyleveld, Deventer, Netherlands, and Cyril Woolf, Morristown, N.J., assignors to Allied Chemical Corporation, New York, N.Y.
No Drawing. Filed July 9, 1971, Ser. No. 161,349
Int. Cl. C07c 119/00
U.S. Cl. 260—566 R                            6 Claims

ABSTRACT OF THE DISCLOSURE

Novel fluoroperhalodiazaolefins are prepared by reacting a fluoroperhaloalkylidene imine with a fluoroperhaloazaolefin in an aprotic, polar liquid reaction medium in the presence of an ionizable fluoride salt. For example, perfluoro-2,4,4,6-tetramethyl-3,5-diaza - 2,5 - heptadiene is prepared by reacting hexafluoroisopropylidene imine with perfluoro-2,4-dimethyl-3-aza-2-pentene in acetonitrile in the presence of potassium fluoride. The fluoroperhalodiazaolefins are useful as liquid dielectrics and as intermediates in the preparation of other fluorinated organic compounds.

---

This invention provides a novel class of fluoroperhalodiazaolefins and a method for their preparation.

In accordance with this invention, fluoroperhalodiazaolefins having the formula

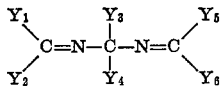

wherein $Y_1$, $Y_2$, $Y_3$, $Y_4$, $Y_5$ and $Y_6$ are independently fluorine or fluoroperhaloalkyl radicals having either the formula $CF_2X(CFX)_m$— wherein X is fluorine or chlorine and $m$ is 0 to 6, or the formula

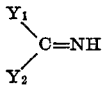

wherein X is chlorine or fluorine and $n$ is 3 to 5, are prepared by reacting, in an aprotic, polar, liquid reaction medium under substantially anhydrous conditions at a temperature ranging from about 40° C. to about 200° C., a fluoroperhaloalkylidene imine having the formula

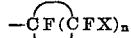

wherein $Y_1$ and $Y_2$ are as defined above, with a fluoroperhaloazaolefin having the formula

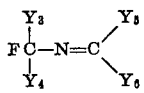

wherein $Y_3$, $Y_4$, $Y_5$ and $Y_6$ are as defined above, the reaction being carried out in the presence of an ionizable fluoride salt.

The fluoroperhalodiazaolefin is recovered from the reaction mixture in accordance with conventional methods, such as by fractional distillation.

Suitable ionizable fluoride salts include potassium fluoride, rubidium fluoride, cesium fluoride, silver fluoride and tetra(lower alkyl) ammonium fluoride. Potassium fluoride is preferred. In addition to acting as a catalyst, the fluoride salt also acts as an acceptor of the hydrogen fluoride which is generated as a by-product. Accordingly, one mole of fluoride salt is consumed for each mole of hydrogen fluoride generated.

One mole of hydrogen fluoride is generated for each mole of diazaolefin product produced; and one mole of product is produced by the reaction of one mole of each reactant. Hence, the reactants and the fluoride salt are consumed in a 1:1:1 molar ratio, although the three materials can be added to the reaction mixture in any relative proportion if desired. However, it is preferable to add an excess, up to a molar ratio of about 5:1, preferably up to 3:1, of the fluoride salt over the reactant which is present in the lesser amount on a molar basis.

Suitable aprotic, polar, liquid reaction media include acetonitrile, dimethyl formamide, dimethylsulfoxide, dimethylacetamide, glycol ethers, cyclic polymethylene sulfones, and the like. Acetonitrile is preferred.

The reaction is preferably carried out at a temperature ranging from about 50° C. to about 150° C. The pressure employed is not critical and can be above or below atmospheric pressure as desired. However, the reaction is conveniently carried out at pressures autogenously developed at the reaction temperatures employed.

The fluoroperhaloalkylidene imine reactants are a known class of compounds, being described, for example, in U.S. Pat. 3,226,439, Journal of Organic Chemistry, vol. 30, p. 1398 (1965), and our copending application Ser. No. 14,653, filed Feb. 26, 1970, the pertinent subject matter of which is incorporated herein by reference.

The fluoroperhaloazaolefin reactants are also a known class of compounds, being described, for example, in U.S. Pat. 2,643,267 and our copending application Ser. No. 14,652, filed Feb. 26, 1970, the pertinent subject matter of which is incorporated herein by reference.

In the preferred embodiments of this invention, $Y_1$, $Y_2$, $Y_3$, $Y_4$, $Y_5$ and $Y_6$ are independently fluorine or fluoroperhaloalkyl radicals having the formula $CF_2X(CFX)_m$— wherein X is fluorine or chlorine, preferably fluorine, and $m$ is 0 to 6, preferably 0 to 3. Especially good results are obtained when $Y_1$, $Y_2$, $Y_3$, $Y_4$, $Y_5$ and $Y_6$ are trifluoromethyl.

The fluoroperhalodiazaolefins of this invention are useful as dielectric liquids for insulating or cooling electrical apparatus. They are employed in accordance with conventional methods for employing dielectric liquids.

The following examples further illustrate the invention. In each example, the reaction was carried out under substantially anhydrous conditions.

EXAMPLE 1

27.5 grams of hexafluoroisopropylidene imine and 55 grams of perfluoro-2,4-dimethyl-3-aza-2-pentene were added to 11.6 grams of potassium fluoride in 50 ml. of acetonitrile. The reaction mixture was then sealed, maintained at about 75° C. for about 18 hours, allowed to stand at room temperature over a weekend, and then maintained at 75° C. for an additional 18 hours. The reaction mixture was filtered to remove the fluoride salt. By fractionally distilling the filtrate, 30 grams of a colorless liquid having a boiling point of about 100° C. was obtained. The liquid was identified as perfluoro-2,4,4,6-tetramethyl - 3,5 - diaza - 2,5 - heptadiene. No significant amount of by-products was observed, thereby indicating a high conversion based on the amount of reactants consumed.

EXAMPLE 2

The general procedure of Example 1 was followed using the following amounts of materials:

80 grams of hexafluoroisopropylidene imine
166 grams of perfluoro-2,4-dimethyl-3-aza-2-pentene
58 grams of potassium fluoride
100 ml. of acetonitrile The reaction was initiated at 60° C. and the reaction mixture was maintained at that temperature for about six days, except that on the second day the reaction mixture was maintained at between 80° and 100° C. for about 8 hours. After the salt had been removed by filtration, 174 grams of the desired product were recovered by fractional distillation. The identity of the product, which had a specific gravity of 1.7 at 25° C., was confirmed by infrared spectrum and nuclear magnetic resonance analyses.

The utility of the perfluoro-2,4,4,6-tetramethyl-3,5-diaza-2,5-heptadiene product as a liquid dielectric was established by determining the following properties of the compound:

Dielectric constant, 1 kc. (ASTM D-150) __ 2.2
Dielectric strength, kv./mil (ASTM D-877) _ 28.3
Dissipation factor, 1 kc. (ASTM D-150) __ 0.0006
Volume resistivity, ohm-cm. (ASTM D-257) _ $3.96 \times 10^{12}$

We claim:
1. A fluoroperhalodiazaolefin having the formula

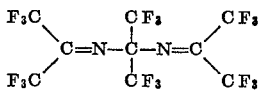

2. A process for preparing a fluoroperhalodiazaolefin having the formula

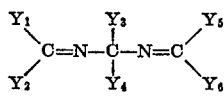

wherein $Y_1$, $Y_2$, $Y_3$, $Y_4$, $Y_5$ and $Y_6$ are independently fluorine or fluoroperhaloalkyl radicals having either the formula $CF_2X(CFX)_m-$ wherein X is fluorine or chlorine and $m$ is 0 to 6, or the formula

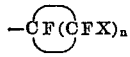

wherein X is chlorine or fluorine and $n$ is 3 to 5, which process comprises reacting, in an aprotic, polar, liquid reaction medium under substantially anhydrous conditions at a temperature ranging from about 40° C. to about 200° C., a fluoroperhaloalkylidene imine having the formula

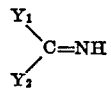

wherein $Y_1$ and $Y_2$ are as defined above, with a fluoroperhaloazaolefin having the formula

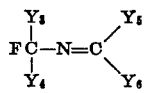

wherein $Y_3$, $Y_4$, $Y_5$ and $Y_6$ are as defined above, the reaction being carried out in the presence of a fluoride salt selected from the group consisting of potassium, rubidium, cesium, silver and tetra (lower alkyl) ammonium fluoride.

3. The process of claim 2 wherein $Y_1$, $Y_2$, $Y_3$, $Y_4$, $Y_5$ and $Y_6$ are independently fluorine or fluoroperhaloalkyl radicals having the formula $CF_2X(CFX)_m-$ wherein X is fluorine or chlorine and $m$ is 0 to 6.

4. The process of claim 3 wherein $m$ is 0 to 3.
5. The process of claim 4 wherein X is fluorine.
6. The process of claim 5 wherein $Y_1$, $Y_2$, $Y_3$, $Y_4$, $Y_5$ and $Y_6$ are trifluoromethyl.

References Cited
UNITED STATES PATENTS 3,584,048  6/1971  Ogden _____ 260—566 D LEON ZITVER, Primary Examiner G. A. SCHWARTZ, Assistant Examiner U.S. Cl. X.R.

252—66; 260—566 D